United States Patent Office 3,370,099
Patented Feb. 20, 1968

3,370,099
ISOMERIZATION PROCESS
Charles J. Plank, Woodbury, and Edward J. Rosinski, Almonesson, N.J., assignors to Mobil Oil Corporation, a corporation of New York
No Drawing. Filed Dec. 12, 1962, Ser. No. 244,010
The portion of the term of the patent subsequent to July 7, 1981, has been disclaimed
13 Claims. (Cl. 260—666)

This invention relates to the catalytic conversion of hydrocarbons and more particularly to an improved process for the catalytic hydroisomerization of hydrocarbons.

The isomerization of hydrocarbons into one or more products suitable for use in the petroleum and chemical industries has heretofore been effected by a wide variety of catalysts. Basic catalysts such as the alkali metal hydroxides have been employed to isomerize olefin-containing feed material into valuable isomeric derivatives which can be used as intermediates in chemical synthesis or for blending purposes to obtain high octane fuel. Other catalysts which have been employed include acidic halides such as aluminum chloride, aluminum bromide, boron trifluoride and hydrogen chloride; hydrogen acids such as sulfuric acid and organic derivatives thereof, e.g., chlorosulfonic, fluorosulfonic acid, ethane sulfonic acid, etc.; and acidic chalcides comprising compounds of elements of Group VIA of the Periodic Table and composites thereof with other compounds such as chromia, magnesia, molybdena, thoria, zirconia and the like. Acidic catalysts have been widely used to increase or upgrade the octane value of straight run or thermal gasoline fractions composed of straight chain, slightly branched chain, and cyclic paraffins and olefins, all of which have relatively low octane values.

Although various catalysts possess one or more desired characteristics, a majority of the catalysts heretofore employed suffer from several disadvantages which influence the efficiency of an isomerization process. Acids halides such as aluminum chloride, for example, may be used in the low temperature isomerization of paraffins, but are partially soluble in the feed material and are easily lost from the catalyst zone. Catalysts of this type are also uneconomical because of their extreme corrosiveness and requirement for recovery from the effluent products. Other catalysts of the heterogeneous type, such as silica-alumina, do not possess sufficient acidity to provide effective isomerization of low molecular weight paraffins and necessitate the use of relatively high temperatures above the order of 800° F. High temperatures, however, increase the tendency of paraffins to crack, frequently producing coke, which in turn prevents selectivity and further leads to high catalyst consumption due to loss of catalyst activity. Other catalysts of the so-called dual function type which possess cracking and hydrogenation activity, e.g., a platinum impregnated silica-alumina, are conventionally used in hydroisomerization processes but because of their low acid strength temperatures of 800° F. or higher are required for reasonable conversions. Processes of this type are economically unattractive due to the equipment involved and the cost of recycling as occasioned by poor isomerization selectivity due to equilibrium considerations.

It is an object of the present invention to provide an improved process for the catalytic hydroisomerization of hydrocarbons wherein the process is carried out under low temperatures.

Another object of the invention is to carry out the hydroisomerization of isomerizable hydrocarbons at low temperatures and in the presence of novel catalyst compositions.

It is a further object to provide an improved process for the hydroisomerization of isomerizable aliphatic, alicyclic and aromatic hydrocarbons through use of novel catalyst compositions whereby controlled isomerization reactions can be effected at relatively low temperatures substantially unaccompanied by deleterious side reactions leading to the formation of cracked products.

In one embodiment, the invention relates to an improvement in the low temperature hydroisomerization of isomerizable hydrocarbons in the presence of a catalyst composition comprising an aluminosilicate containing at least 0.5 equivalents per gram atoms of aluminum of metal cations of which at least some and preferably 50% or more of the total equivalents are cations of a rare earth metal, said catalyst prepared by treating a precursor aluminosilicate with a fluid medium containing a rare earth metal cation for a period of time until at least some and preferably 50% or more of the total equivalents are cations of a rare earth metal.

In another embodiment, the invention relates to a process which comprises contacting an isomerizable hydrocarbon in the presence of hydrogen under pressure with a catalyst comprising an aluminosilicate containing 0.8 to 1.0 equivalents per gram atom of aluminum of trivalent rare earth metal cations wherein the catalyst is prepared by treating a precursor aluminosilicate with an aqueous medium containing trivalent rare earth metal cations and having a pH ranging from about 3.0 to 10.0, washing the material so treated free of soluble matter, and thereafter drying and thermally activating the product by heating at temperatures ranging from about 400° F. to 1500° F.

In still another embodiment, the invention relates to a process which comprises contacting an isomerizable hydrocarbon in the presence of hydrogen with a catalyst comprising an alumino-silicate containing at least 0.5 equivalents per gram atom of aluminum of metal cations consisting of rare earth metal cations wherein the cations are a single rare earth metal or mixture of rare earth metal cations, said catalyst prepared by treating a precursor aluminosilicate with an aqueous medium having a pH ranging from about 3.0 to 10.0 and containing a rare earth metal salt or mixture of rare earth metal salts, washing the treated material free of soluble matter, and drying and thermally activating the resulting product by heating at temperatures ranging from about 400° F. to 1500° F.

A still further embodiment of the invention relates to a method for the catalytic hydroisomerization of hydrocarbons by contacting an isomerizable hydrocarbon with a catalyst composition comprising an aluminosilicate of the above character which may have incorporated therewith a component possessing hydrogenation activity.

The catalyst compositions used for purposes of the invention are aluminosilicates which contain at least 0.5 equivalents per gram atom of aluminum, preferably 0.5 to 1.0 equivalents, of metal cations wherein at least some and preferably 50% or more of the total equivalents are cations of at least one rare earth metal. In general, the compositions are prepared by treating a precursor aluminosilicate with a fluid medium containing a source of rare earth cations, e.g., a rare earth metal salt, to provide a crystalline or crystalline-amorphous aluminosilicate composition which contains rare earth metal cations.

The catalyst compositions are prepared by treating a precursor aluminosilicate with an aqueous medium containing a salt of one or more rare earth metals. The pH value of the fluid medium may vary within wide limits depending upon the precursor aluminosilicate and its atomic array of silicon and aluminum. Where the precursor material has an atomic ratio of silicon to aluminum greater than about 3.0, the pH value of the fluid medium containing the rare earth salt ranges from about 3.0 to 10.0; with an atomic ratio between about 2.5 and 3.0, the pH value ranges from about 3.5 to 10.0, and is preferably 4.5 to 8.5. Where the atomic ratio is less than about 2.5, the pH value of the fluid medium will range between about 4.5 and 10.0, and is preferably within the range of 4.5 to 8.5.

In carrying out the treatment with the fluid medium, the procedure employed comprises contacting the aluminosilicate with the desired fluid medium until such time as at least some and preferably 50% or more of the total equivalents of metal cations originally present in the aluminosilicate are replaced. Elevated temperatures tend to hasten the speed of treatment whereas the duration thereof varies inversely with the concentration of the ions in the fluid medium. In general, the temperatures employed range from below ambient room temperature of about 24° C. up to temperatures below the decomposition temperatures of the aluminosilicate. Following the fluid treatment, the treated aluminosilicate is preferably washed with water, usually distilled water, until the effluent wash water has a pH of wash water, i.e., between 4 and 8. The resulting product is thereafter dried and activated by heating in an inert atmosphere at temperatures ranging from 400° F. to 1500° F.

The actual procedure employed for carrying out the fluid treatment of the aluminosilicate may be accomplished in a batchwise or continuous method under atmospheric, subatmospheric or superatmospheric pressure. A solution of the rare earth ions in a form of aqueous or non-aqueous solution may be passed slowly through the fixed bed of an aluminosilicate. If desired, hydro-thermal treatment or a corresponding non-aqueous treatment with polar solvents may be effected by introducing the aluminosilicate and fluid medium in a closed vessel maintained under autogenous pressure.

A wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malonates, oxalates, palmitates, hydroxides, tartarates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, lutetium and ytterbium.

The rare earth metal salts employed can either be the salt of a single rare earth metal or mixtures of rare earth metals, such as rare earth chlorides or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and a representative mixture contains the chlorides of the rare earth having the relative composition: cerium (as $CeO_2$) 48% by weight, lanthanum (as $La_2O_3$) 24% by weight, praseodymium (as $Pr_6O_{11}$) 6% by weight, neodymium (as $Nd_2O_3$) 19% by weight, samarium (as $Sm_2O_3$) 2% by weight, gandolinium (as $Gd_2O_3$) 0.7% by weight, others + yttrium (as $R_2O_3$) 0.2% by weight. Didymium chloride is also a mixture of rare earth chlorides, but having a low cerium content. A representative mixture consists of the following rare earths determined as oxides: lanthanum, 46% by weight; cerium, 1% by weight; praseodymium, 10% by weight; neodymium, 32% by weight; samarium, 6% by weight; gadolinium, 3% by weight; yttrium, 0.5% by weight; other rare earths 1% by weight. It is to be understood that other mixtures of rare earths are applicable in the instant invention.

The aluminosilicate used for purposes of the invention may be represented by the following formula, expressed in terms of mole ratios of oxides:

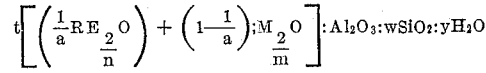

wherein $t$ is a number within the range of 0.5 to 1.0, $a$ is a number, including fractions, between 1 and 2, RE are cations of at least one rare earth metal, $n$ represents the valence of the cation, $w$ is a number from about 2 to 6, $y$ represents a number having a value up to about 10.0, and M represents cations of at least one metal other than rare earth metals, and $m$ is the valence thereof.

Within the scope of the above formula, the preferred embodiment is where $t$ is 0.8 to 1.0, $a$ is equal to 1, $n$ is equal to 3 and $w$ has a high value, i.e., the aluminosilicate has a high silica to alumina ratio. A more preferred embodiment of the invention is directed to aluminosilicates having a high silica to alumina ratio and 0.8 to 1.0 equivalents per gram atom of aluminum of trivalent cations of at least one rare earth metal. The trivalent rare earth cations can be cations of a single rare earth metal or can be mixtures of rare earth cations. The preferred rare earth cations are those of lanthanum, cerium, neodymium, praseodymium, samarium, and gadolinum as well as mixtures of rare earth cations containing a predominant amount of one or more of the above cations.

In instances where the aluminosilicates have associated therewith rare earth cations as well as cations of other metals, i.e., wherein $a$ is greater than 1, it is preferred that M represent cations of metals which have a valence of at least 2, with the cations of divalent metals such as calcium, magnesium, and manganese being particularly preferred.

Monovalent cations such as the alkali metals may be associated with the aluminosilicate; however, their presence, as a general rule, tends to suppress or limit catalytic properties, the activity of which decreases with increasing content of alkali metal cations. In those compositions where alkali metal cations are present, their total amount should be less than 0.25 equivalents and preferably less than 0.10 equivalents per gram atom of aluminum.

The metal aluminosilicate precursor materials include a wide variety of natural and synthetic aluminosilicates which may be represented in their hydrated form by the formula:

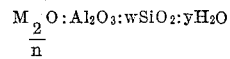

wherein M is a metal cation, $n$ represents the valence of the cation, $w$ the moles of silica, and $y$ the moles of water. The cation may be any or more of a number of metal ions depending on whether the aluminosilicate is synthesized or occurs naturally. Typical cations include sodium, lithium, potassium, silver, magnesium, calcium, zinc, barium, iron and manganese. The proportions of inorganic oxides in these compositions may vary depending upon whether the aluminosilicate is a natural material, such as mordenite, chabazite, gmelinite or ptilolite, or is synthesized from clay materials such as those of the montmorillonite or kaolin families. The main characteristic of these materials is the presence in their molecular structure of at least 0.5 equivalents and usually 0.9±0.1 equivalents of an ion of positive valence per gram atom of aluminum and an ability to undergo dehydration without substantially affecting the spatial arrangement of inorganic oxides within their dimensional framework.

Upon dehydration the useful precursor materials are further characterized by their sorption capacity of at least about 2 weight percent normal butane at 760 mm. and 25° C.

Representative precursor materials include well known synthesized crystalline aluminosilicates which have been designated as Zeolites X, Z, Y, L, D, R, S, T, Z, E, F, Q and B.

Other synthesized crystalline aluminosilicates include those designated as ZK–4 and ZK–5.

ZK–4 can be represented in terms of mole ratios of oxides as:

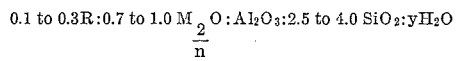

0.1 to 0.3R : 0.7 to 1.0 $M_{\frac{2}{n}}O$ : $Al_2O_3$ : 2.5 to 4.0 $SiO_2$ : $yH_2O$ wherein R is a member selected from the group consisting of methylammonium oxide, hydrogen oxide and mixtures thereof with one another, M is a metal cation having a valence of $n$, and $y$ is any value from about 3.5 to 5.5.

ZK–5 can be represented in terms of mole ratios of oxides as:

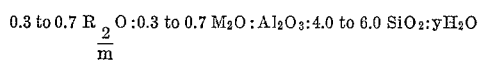

0.3 to 0.7 $R_{\frac{2}{m}}O$ : 0.3 to 0.7 $M_2O$ : $Al_2O_3$ : 4.0 to 6.0 $SiO_2$ : $yH_2O$ wherein R is selected from the group consisting of a nitrogen-containing cation derived from N,N'-dimethyltriethylene diammonium ion and mixtures of said cation with hydrogen and $m$ is a valence thereof; M is a metal and $n$ the valence thereof and $y$ is any value from 6 to about 10.

Among the naturally occurring crystalline aluminosilicates which can be employed for purposes of the invention are included faujasite, heulandite, clinoptilolite, chabazite, gmelinite, mordenite and dachiardite.

Other aluminosilicates which can be used as precursor materials are derived from treating clays.

Of the clay materials, montmorillonite and kaolin families are representative types which include the sub-bentonites, such as bentonite, and the kaolins commonly identified as Dixie, McNamee, Georgia, and Florida clays in which the main mineral constituent is halloysite, kaolinite, dickite, nacrite or anauxite. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The resulting materials are then treated as hereinabove described to obtain the catalyst composition. The treatment with caustic can be effected by reacting mixtures falling within the following weight ratios:

| | |
|---|---|
| $Na_2O$/clay (dry basis) | 1.0–6.6 to 1 |
| $SiO_2$/clay (dry basis) | 0.01–3.7 to 1 |
| $H_2O$/$Na_2O$ (mole ratio) | 35–180 to 1 |

The composition prepared in accordance with the invention provides a means for obtaining exceptionally good catalysts. While the aluminosilicate may contain varying amounts of silicon and aluminum, it has been found that good results can be obtained through use of crystalline aluminosilicates having atomic ratios of silicon to aluminum greater than 1.5 and preferably greater than about 2.7. Preferred materials thus include natural materials such as mordenite and synthesized aluminosilicates such as Zeolites X, Y, T and ZK–5.

The aluminosilicate catalyst prepared in the foregoing manner may be used as a catalyst per se or as intermediates in the preparation of further modified contact masses consisting of a porous matrix and the aluminosilicate. The catalyst may be used in powdered, granular or molded form or formed into spheres, pellets, or finely divided particles having a particle size of 500 mesh or larger (Tyler). In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally the aluminosilicate is dried between 150° F. and 600° F. and thereafter calcined in air or an inert atmosphere at temperatures ranging from 400° F. to 1500° F. for periods of time ranging from 1 to 48 hours or more.

The term "porous matrix" includes organic and/or inorganic compositions with which the aluminosilicate can be combined, dispersed or otherwise intimately admixed wherein the matrix may be active or inactive. It is to be understood that porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregate, pumice, firebrick, diatomaceous earths, activated charcoal, refractory oxides, organic resins, such as polyepoxides, polyamines, polyesters, vinyl resins, phenolics, amino resins, melamines, polyesters, vinyl resins, phenolics, amino resins, melamines, acrylics, alkyds, epoxy resins, etc., and inorganic oxide gels.

A preferred embodiment of the invention is the use of finely divided aluminosilicate catalyst particles in a porous matrix consisting of an inorganic oxide gel wherein the catalyst is present in such proportions that the resulting product contains about 2 to 95% by weight, preferably about 5 to 50% by weight, of the aluminosilicate in the final composite.

The aluminosilicate-inorganic oxide gel compositions can be prepared by several methods wherein the aluminosilicate is reduced to a particle size less than 40 microns, preferably within the range of 1 to 10 microns, and intimately admixed with an inorganic oxide gel while the latter is in the hydrous state such as in the form of a hydrosol, hydrogel, wet gelatinous precipitate or a mixture thereof. Thus, finely divided active aluminosilicate can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Patent 2,384,946. The aluminosilicate-inorganic oxide gel thus obtained is washed free of soluble salts and thereafter dried and/or calcined as desired. The total alkali metal content of the resulting composite, including alkali metals which may be present in the aluminosilicate as an impurity, is less than about 4 percent and preferably less than about 3 percent by weight based on the total composition. If an inorganic oxide gel matrix is employed having too high an alkali metal content, the alkali metal content can be reduced by treating with a fluid media previously set forth either before or after drying.

In a like manner, the active aluminosilicate may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide, which, upon drying, is converted to alumina.

The aluminosilicate may be incorporated with the aluminiferous oxide while the latter is in the form of hydrosol, hydrogel or wet gelatinous precipitate or hydrous oxide.

The inorganic oxide gel may also consist of a semi-plastic or plastic clay material. The aluminosilicate can be incorporated into the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc.

The inorganic oxide gel may also consists of a plural gel comprising a predominant amount of silicia with one or more metal oxides thereof selected from Groups IB, II, III, IV, V, VI, VII and VIII of the Periodic Table. Particular preference is given to the plural gels or silica with metal oxides of Groups IIA, III and IVA of the Periodic Table, especially wherein the metal oxide is magnesia, alumina, zirconia, titania, beryllia, thoria or combination thereof. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, chromium, cobalt, tungsten, uranium, platinum, lead, zinc, calcium, magnesium, barium, lithium, nickel, and their compounds as well as silica, alumina, silica-alumina, or other siliceous oxide combinations as fines in amounts ranging from 0.5 to 40 percent by weight based on the finished catalyst. Other preferred matrices include powdered metals, such as aluminum, stainless steel, and powders of refractory oxides, such as alumina, etc., having very low internal pore volume. These materials have substantially no inherent catalytic activity of their own.

As a further embodiment of the invention, aluminosilicate catalysts having exceptionally high orders of activity can be prepared by incorporating a precursor metal aluminosilicate in an inorganic oxide gel matrix such as silica-alumina, for example, and thereafter contacting the aluminosilicate with the above-described fluid medium. The treatment is carried out for a sufficient period of time under conditions previously described for obtaining active aluminosilicates.

The catalysts of the present invention are extremely active and may be used for the isomerization of a wide variety of feed stocks. Thus, low boiling normal paraffin hydrocarbons which contain four or more carbon atoms such as normal butane, normal pentane, normal hexane, normal heptane, normal octane and the higher straight chain paraffinic homologs may be isomerized in accordance with the invention. Simple branched chain paraffins also may be isomerized to more highly branched chain configurations as in the case of isomerizing 2- and 3-methylpentanes to 2,3-dimethylbutane, for example. Straight run naphthas, straight run and cracked gasolines, and other refinery process streams which predominate in paraffins may be used as such or further concentrated to provide a single paraffin feed material. Similarly high molecular weight paraffins also may be isomerized to provide valuable isomeric derivatives which can be used in the preparation of lubricants, waxes, and jet fuels. The process of the invention is further applicable to the isomerization of normally gaseous or normally liquid olefins having a normal or branched chain structure, such as, for example, normal butene, normal pentene, 2-methyl-1-pentene, 2-methyl-2-pentene, 3-methyl-2-pentene, and the like. Pure olefins, mixtures thereof, or mixtures of such olefins with one or more saturated or unsaturated hydrocarbons likewise may be used. Further included as feed materials are alicyclic hydrocarbons such as cyclohexane, cycloheptane, etc.; alkyl-substituted alicyclic hydrocarbons, such as methyl, propyl, butyl and pentyl-substituted cyclopentanes, cyclohexanes, cyclopentenes, cyclohexenes, etc.; cyclic olefins such as methylenecyclopentane, methylenecyclohexane, etc.; and alkyl-substituted aromatic and fused aromatic hydrocarbons such as pentyl naphthalene, butyl benzene, ethyl benzene, dimethylbenzenes, trimethylbenzenes, and the like. Other feed materials include allenes, alkyl acetylenes, and mono- or polyethenoid terpenes such as limonene.

If desired, conventional diluents, such as carbon dioxide, sulfur dioxide, etc., may be admixed with the feed material.

The isomerization of hydrocarbons in accordance with the invention may be carried out in such processes which employ a fixed bed of catalyst, a moving bed of catalyst, a fluidized catalyst, or any combination thereof. If desired, the catalyst composition may contain a hydrogenation-dehydrogenation component. The amount of hydrogenation-dehydrogenation component will vary within relatively wide limits of from about 0.01 to 10% and will usually be within the range of 0.1 to 5% by weight based on the final catalyst composition. Representative components may be chosen from any one or more of the various Groups V, VI, VII, and VIII metals as well as the oxides and sulfides thereof, representative materials being platinum, palladium, molybdenum, tungsten, vanadium, rhenium, chromium, nickel, cobalt and the like.

The hydrogenation-dehydrogenation component may be introduced as a cation or incorporated by conventional techniques of impregnation, precipitation, coprecipitation, and the like. The incorporation of platinum, for example, may be accomplished by deposition of a salt of the metal from an aqueous solution with subsequent drying and reduction of the metal compound to the metal.

The conditions under which hydrocarbons are isomerized in accordance with the invention include a temperature ranging from between ambient room temperature to about 750° F. and preferably between about 250° F. and 650° F. The liquid hourly space velocity (LHSV) is between about 0.05 and 40 and preferably between about 0.25 and 10. The molar ratio of hydrogen to hydrocarbon charge is between about 0.1 and 20 and is preferably between 0.5 and 5. The reaction may be effected under liquid or vapor phase conditions at atmospheric, subatmospheric or superatmospheric pressure. In general, the pressure will range from between about 5 to 7500 p.s.i.a., and is preferably between about 100 and 700 p.s.i.a. Within these limits, the isomerization conditions will vary considerably depending upon equilibrium consideration and whether the feed material is paraffin, naphthene or aromatic, etc. In general, optimum conditions are those in which a maximum yield of isomer is obtained and hence considerations of temperature will vary within a range of conversion levels designed to provide the highest selectivity and maximum yield of desired isomer.

The following examples illustrate the best mode now contemplated for carrying out the invention.

EXAMPLE 1

Crystalline sodium aluminosilicate characterized by a structure having a uniform effective pore diameter in the range of 6 to 15 angstrom units was prepared by admixture of the following solutions:

| A. Sodium Silicate Solution: | Lbs. |
|---|---|
| Water | 143 |
| Sodium Hydroxide (77.5% $Na_2O$) | 11 |
| Sodium Silicate (28.8% SiO) | 77.5 |
| | 231.5 |

B. Sodium Aluminate Solution: Lbs.
Water _____ 195
Sodium Hydroxide (77.5% $Na_2O$) _____ 11
Sodium Aluminate (43.5% $Al_2O_3$) and 30.2%
$Na_2O$ _____ 25.6
                                              —————
                                              231.6

Solution B having a specific gravity at 111° F. of 1.128 was added to Solution A, having a specific gravity of 1.172 at 68° F. with vigorous agitation to form a creamy slurry. The resulting slurry was heated for 12 hours at 205° F. and was thereafter filtered. The filter cake was washed with water until the water in equilibrium with the washed solid had a pH of 11. The washed filter cake was then dried in air at a temperature of 280° F.

EXAMPLE 2

A portion of the crystalline sodium aluminosilicate prepared in Example 1 was incorporated, to the extent of 25 percent by weight, in a silica-alumina gel matrix prepared by admixture of the following solutions:

A. Sodium Silicate Solution: Wt. percent
Sodium silicate ($Na_2O/SiO_2$=0.3/1) _____ 42.6
Water _____ 53.1
Sodium aluminosilicate powder _____ 4.3

B. Acid Solution:
Water _____ 93.34
Aluminum sulfate _____ 3.43
Sulfuric acid _____ 3.23

Solution A having a specific gravity of 1.191 at 76° F. and Solution B having a specific gravity of 1.059 at 79° F. were continuously mixed together through a mixing nozzle using 398 cc. per minute of the silicate solution at 58° F. and 320 cc. per minute of the acid solution at 40° F. The resulting hydrosol, containing 25 percent by weight dispersed crystalline sodium aluminosilicate powder, on a finished catalyst basis, was formed into hydrogel beads at 63° F. with a gelation time of 1.7 seconds at a pH of 8.5.

The resulting hydrogel beads were treated at room temperature with a 2 percent by weight aqueous solution of rare earth chloride hexahydrates containing cerium chloride and the chlorides of praseodymium, lanthanum, neodymium and samarium. The treatment was carried out using nine 2-hour contacts and three overnight contacts of approximately 18 hours each. The final product, after being washed, dried for 20 hours at 270° F. and calcined 10 hours at 1000° F., analyzed 0.44 weight percent sodium and 11.5 weight percent rare earth determined as rare earth oxide.

EXAMPLE 3

A catalyst composition prepared entirely analogous to the catalyst of Example 2 was impregnated with platinum as follows:

46.3 grams of catalyst was impregnated under vacuum with 0.5 weight percent Pt as $H_2PtCl_6$ using 2.65 cc. of standard $H_2PtCl_6$ solution diluted to 30.6 cc. The impregnated catalyst was then wet aged at 230° F. for 16 hours and activated with hydrogen for two hours. The product analyzed 0.43 weight percent Pt and 0.18 weight percent Cl.

EXAMPLE 4

A catalyst composition prepared entirely analogous to the catalyst of Example 2 was impregnated with dehydrogenation components in the following manner:

The catalyst base was impregnated under vacuum with a water solution of ammonium molybdate (6.4 grams ammonium molybdate in 36.6 cc. total solution per 46.3 grams of catalyst base). The composition was dried 20 hours at 230° F., re-impregnated with cobaltous chloride (5.06 $CoCl_2 \cdot 6H_2O$ in 36.6 cc. solution), redried and then calcined for 3 hours at 1000° F. The final product, which analyzed 3.08 weight percent CoO and 8.80 weight percent $MoO_3$, was then sulfided at 800° F. with a mixture of hydrogen sulfide and hydrogen (50% $H_2S$/50% $H_2$).

The catalysts prepared in Examples 3 and 4 were evaluated for isomerization activity and compared to the activity of a silica-zirconia reference catalyst (90 wt. percent $SiO_2$ and 10 wt. percent ZrO) which was impregnated with 0.5 weight percent platinum. The data obtained and summarized in Table 1 below show good activity of the catalyst at low temperatures and further illustrate the production of high isoparaffin to normal paraffin ratios amounting to 20% or more above the ratios normally achieved with conventional catalysts.

TABLE I
[Feed: Mid-Continent gas oil, B.P. 650–1,000°F.]

| Catalyst | Ex. 3 | Ex. 4 | Si/Zr |
|---|---|---|---|
| Temperature | 740 | 749 | 798 |
| LHSV | 0.5 | 0.5 | 0.5 |
| $H_2$/Hydrocarbon Feed | 9 to 10–1 | 9 to 10–1 | 9 to 10–1 |
| Pressure, p.s.i.g | 2,000 | 2,000 | 2,000 |
| Yields, vol. percent: | | | |
| i-$C_4$ | 4.9 | 6.4 | 2.5 |
| n-$C_4$ | 2.9 | 3.4 | 2.1 |
| i-$C_5$ | 5.0 | 7.3 | 2.6 |
| n-$C_5$ | 1.6 | 1.2 | 1.5 |

EXAMPLE 5

A crystalline aluminosilicate identified as Zeolite 13X was treated with a 2% by weight aqueous solution of rare earth chloride hexahydrate. The final product, after being washed, dried for 20 hours at 270° F. and calcined 10 hours at 1000° F., analyzed 0.39 weight percent sodium and 28.8 weight percent rare earth determined as rare earth oxide.

EXAMPLE 6

The catalyst composition of Example 5 was evaluated for the atmospheric hydroisomerization of normal hexane in the following manner.

About 0.5 cc. of catalyst were admixed with 0.5 cc. of Vycor glass chips and treated in a stream of air at 1000° F. to remove the liquid water phase. The temperature was then adjusted and maintained at 1000° F. for 30 minutes and thereafter lowered to the temperatures shown below. 2 cc. of hexane/minute was passed continuously over the catalyst utilizing a $H_2$/hexane ratio of 4 to 1. The effluent stream, analyzed by gas-chromotography, showed that hexane isomers were produced as follows:

TABLE II

| | Minutes On Stream | Cracked Products | Isomers | Selectivity |
|---|---|---|---|---|
| 600° F | 10 | 10.8 | 10.3 | 48.8 |
| | 35 | 4.7 | 9.4 | 66.7 |
| | 60 | 1.9 | 4.4 | 69.8 |
| Regenerated*—500° F | 10 | 0 | 2.3 | 100 |
| Regenerated*—500° F | 10 | 9.3 | 9.7 | 51.1 |
| | 35 | 4.7 | .7.3 | 60.8 |
| | 60 | 3.9 | 6.3 | 61.8 |

* 30 minute air treatment at 1,000° F.

What is claimed is:
1. Method for the isomerization of hydrocarbons which comprises contacting an isomerizable hydrocarbon in the presence of hydrogen at a temperature between about 250° F. and 650° F. at a liquid hourly space velocity between about 0.05 and 40 with a catalyst composition comprising a crystalline aluminosilicate having less than about 0.25 equivalents of alkali metal per gram atom of aluminum and containing metallic cations wherein at least some of the cations are cations of a rare earth metal.

2. Method of claim 1 wherein the aluminosilicate contains at least 0.5 equivalents per gram atom of aluminum of metallic cations wherein at least 50% of the total equivalents are cations of a rare earth metal.

3. Method of claim 1 wherein the aluminosilicate contains about 0.8 to 1.0 equivalents per gram atom of aluminum of rare earth metal cations.

4. Method of claim 1 wherein the aluminosilicate has a silicon to aluminum ratio greater than about 1.5.

5. Method for the isomerization of hydrocarbons which comprises contacting an isomerizable hydrocarbon in the presence of hydrogen at a temperature between about 250° F. and 650° F. at a liquid hourly space velocity between about 0.05 and 40 with a catalyst composition comprising a crystalline aluminosilicate having less than about 0.25 equivalents of alkali metal per gram atom of aluminum and having the formula

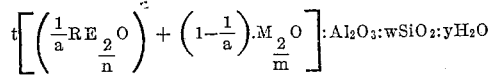

wherein $t$ represents a number within the range of 0.5 to 1.0; $a$ is a number between 1 and 2; RE is a rare earth cation and $n$ the valence thereof; M represents a metal cation other than rare earth metal and $m$ the valence thereof; $w$ is a number of about 2 to 6, and $y$ is any number having a value up to about 10.0.

6. Method of claim 5 wherein the catalyst composition contains a hydrogenation-dehydrogenation component.

7. Method of claim 5 wherein the catalyst composition is combined with a porous matrix.

8. Method of claim 5 wherein $t$ has a value of about 0.8 to 1.0.

9. Method of claim 8 wherein the rare earth metal cations are selected from the group consisting of lanthanum, praseodymium, gadolinium, samarium, neodymium and mixtures thereof.

10. Method for the isomerization of aliphatic hydrocarbons which comprises contacting under hydrogen pressure an isomerizable aliphatic hydrocarbon at a temperature between about 250° and 650° F. at a liquid hourly space velocity between about 0.05 and 40 with a catalyst comprising a crystalline aluminosilicate containing about 0.5 to 1.0 equivalents per gram atom of aluminum of metal cations wherein at least some of the cations are a rare earth metal, said catalyst prepared by treating a precursor aluminosilicate with a fluid medium containing a rare earth metal cation for a period of time sufficient to reduce the alkali metal content to less than about 0.25 equivalents per gram atom of aluminum and until at least some of the total equivalents are cations of a rare earth metal, washing the treated material free of soluble matter, and thereafter drying and thermally activating the resulting product by heating at temperatures ranging from about 400° F. to 1500° F.

11. Method for the isomerization of aromatic hydrocarbons which comprises contacting under hydrogen pressure an isomerizable aromatic hydrocarbon at a temperature between about 250° F. and 650° F. at a liquid hourly space velocity between about 0.05 and 40 with a catalyst composition comprising a crystalline aluminosilicate containing about 0.5 to 1.0 equivalents per gram atom of aluminum of metal cations wherein at least some of the total equivalents are cations of a rare earth metal, said catalyst prepared by treating a precursor aluminosilicate with a fluid medium containing a rare earth metal cation for a period of time sufficient to reduce the alkali metal content to less than about 0.25 equivalents per gram atom of aluminum and until at least some of the total equivalents are cations of a rare earth metal, washing the treated material free of soluble matter, and thereafter drying and thermally activating the resulting product by heating at temperatures ranging from about 400° F. to 1500° F.

12. Method for the isomerization of alicyclic hydrocarbons which comprises contacting under hydrogen pressure an isomerizable alicyclic hydrocarbon at a temperature between about 250° F. and 650° F. at a liquid hourly space velocity between about 0.05 and 40 with a catalyst composition comprising a crystalline aluminosilicate containing about 0.5 to 1.0 equivalents per gram atom of aluminum of metal cations wherein at least some of the cations are a rare earth metal, said catalyst prepared by treating a precursor aluminosilicate with a fluid medium containing a rare earth metal cation for a period of time sufficient to reduce the alkali metal content to less than about 0.25 equivalents per gram atom of aluminum and until at least some of the total equivalents are cations of a rare earth metal, washing the treated material free of soluble matter, and thereafter drying and thermally activating the resulting product by heating at temperatures ranging from about 400° F. to 1500° F.

13. Method of claim 11 wherein the aromatic hydrocarbons are dimethylbenzenes.

References Cited

UNITED STATES PATENTS

| | | | |
|---|---|---|---|
| 3,247,099 | 4/1966 | Oleck et al. | 208—138 |
| 3,210,267 | 10/1965 | Plank | 260—666 |
| 3,114,696 | 12/1963 | Weisz | 260—683.65 X |
| 3,121,754 | 2/1964 | Mattox | 260—683.65 X |
| 2,971,903 | 2/1961 | Kimberlin et al. | 260—683.5 |
| 2,988,578 | 6/1961 | Fleck et al. | 260—683.2 |
| 3,069,482 | 12/1962 | Fleck et al. | 260—666 |

FOREIGN PATENTS 777,233   6/1957   Great Britain.

DELBERT E. GANTZ, *Primary Examiner.*

ALPHONSO D. SULLIVAN, *Examiner.*

C. E. SPRESSER, V. O'KEEFE, L. FORMAN,
*Assistant Examiners.*

Disclaimer 3,370,099.—*Charles J. Plank*, Woodbury, and *Edward J. Rosinski*, Almonesson, N.J. ISOMERIZATION PROCESS. Patent dated Feb. 20, 1968.
Disclaimer filed Nov. 20, 1968, by the assignee, *Mobil Oil Corporation*.

Hereby disclaims the terminal portion of the term of the patent subsequent to July 7, 1981.

[*Official Gazette April 1, 1969.*]